(12) United States Patent \
Kenney

(10) Patent No.: US 11,644,948 B1 \
(45) Date of Patent: May 9, 2023

(54) METHOD AND SYSTEM FOR PRESENTING SLIDES DURING LIVE PRESENTATIONS

(71) Applicant: Bolt-On IP Solutions, LLC, Boynton Beach, FL (US)

(72) Inventor: William Craig Kenney, Ellenton, FL (US)

(73) Assignee: BOLT-ON IP SOLUTIONS, LLC, Boynton Beach, FL (US)

( * ) Notice: Subject to any disclaimer, the term of this patent is extended or adjusted under 35 U.S.C. 154(b) by 0 days.

(21) Appl. No.: 18/054,368

(22) Filed: Nov. 10, 2022

(51) Int. Cl. \
*G06F 3/0482* (2013.01) \
*G06F 3/04817* (2022.01) \
*G06F 3/14* (2006.01)

(52) U.S. Cl. \
CPC ........ *G06F 3/04817* (2013.01); *G06F 3/0482* (2013.01); *G06F 3/1454* (2013.01)

(58) Field of Classification Search \
CPC .......................... G06F 3/04817; G06F 3/0482; G06F 3/1454 \
See application file for complete search history.

(56) References Cited

U.S. PATENT DOCUMENTS

| | | | |
|---|---|---|---|
| 7,930,638 | B2 | 4/2011 | Jaeger |
| 8,887,088 | B2 | 11/2014 | Oshiro et al. |
| 10,536,418 | B2 | 1/2020 | Brownhill |
| 2005/0034077 | A1* | 2/2005 | Jaeger ..................... G11B 27/34 715/730 |
| 2012/0047421 | A1 | 2/2012 | Holman |
| 2015/0356092 | A1* | 12/2015 | Kritt ................... G06F 16/4393 715/731 |
| 2016/0224224 | A1* | 8/2016 | Seto ......................... G09G 5/14 |
| 2017/0279860 | A1* | 9/2017 | Agarwal ............. H04L 65/1083 |
| 2018/0213180 | A1* | 7/2018 | Lee ...................... H04N 9/8211 |
| 2022/0222421 | A1* | 7/2022 | Mann ..................... G06T 13/00 |

\* cited by examiner

*Primary Examiner* — Anil K Bhargava \
(74) *Attorney, Agent, or Firm* — Sagacity Legal, PLLC

(57) ABSTRACT

A system for presenting slides during a live presentation is described. The system includes a processor configured to display a series of first thumbnails corresponding to a plurality of first slides of a main file and a series of second thumbnails corresponding to a plurality of second slides of an auxiliary file on a presenter view interface of a primary display device. The processor is configured to receive an input corresponding to a desired slide, indicate the desired slide on an indicative portion, and produce the desired slide on a viewing portion. One or more slides disposed in succession to the desired slide is sequentially producible on the viewing portion. Each slide of the one or more slides disposed in succession to a slide produced on the viewing portion is configured to be indicated on the indicative portion prior to being produced on the viewing portion.

16 Claims, 11 Drawing Sheets

METHOD AND SYSTEM FOR PRESENTING SLIDES DURING LIVE PRESENTATIONS

BACKGROUND OF THE INVENTION

Slideshow presentation software has become a staple in many businesses, both for in-person presentations and online presentations. This type of software provides a way to organize content visually, making it easy for the audience to follow along. However, one downside of using existing presentation software is that it can be difficult to access slides out of order. For example, when a presenter, presenting a presentation, wants to access and present the slides in a non-orderly manner, the presenter is typically required to switch between multiple slide files or select different functionality of the slide software. This can result in an interruption in the presentation, a risk of losing the audience's attention, or a loss of time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
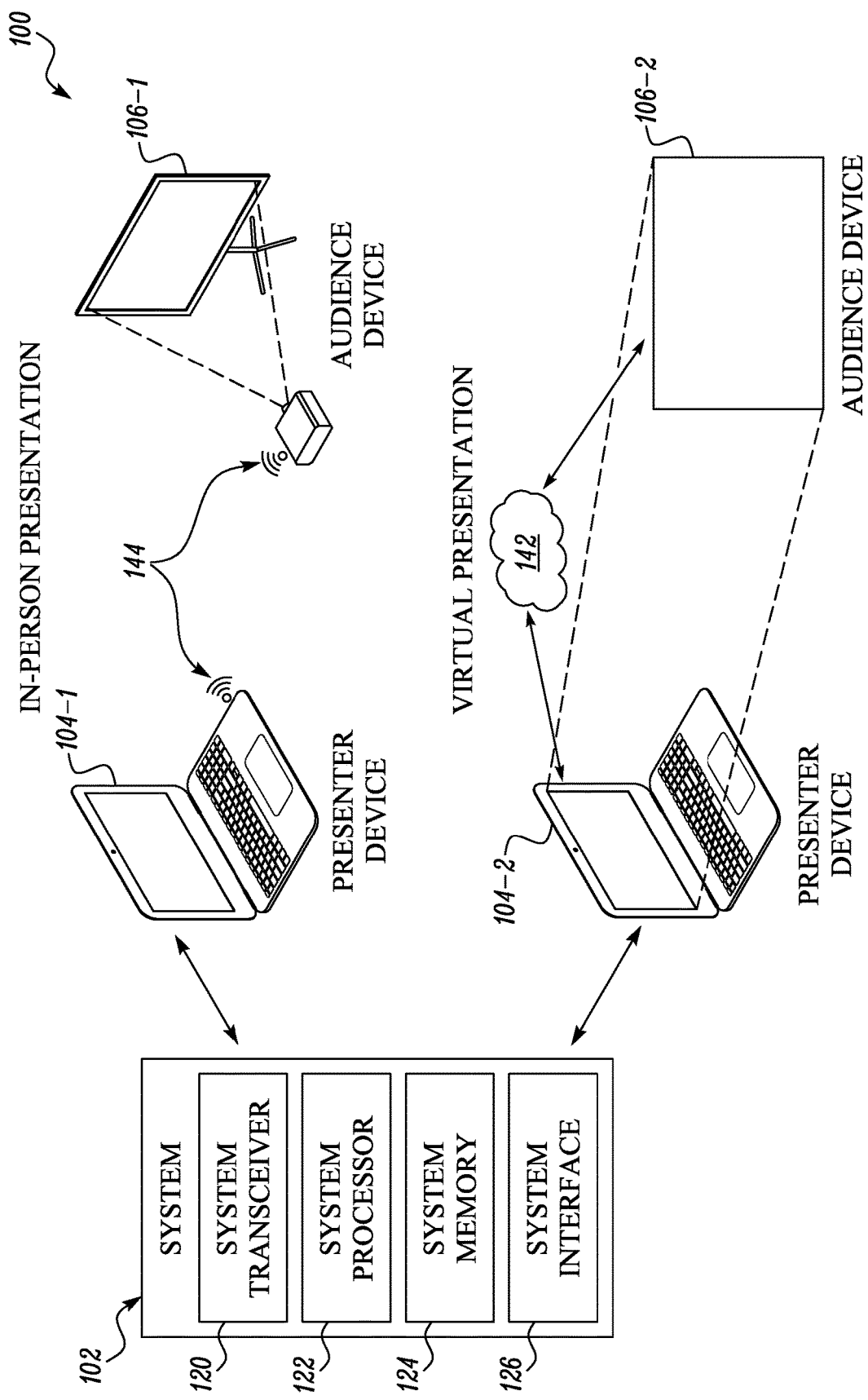
FIG. 1 illustrates an exemplary environment including a system for presenting slides during a live presentation, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a system for presenting slides during a live presentation is described. The system includes a transceiver, a memory, a primary display device; and a processor communicatively coupled to the transceiver, the primary display device, and the memory. The memory stores a set of instructions executable by the processor, and upon execution of the stored instructions, the processor is configured to display a series of first thumbnails corresponding to a plurality of first slides of a main file on a presenter view interface of the primary display device. The plurality of first slides being arranged in a first order. The plurality of first slides is sequentially producible on a viewing portion of the presenter view interface according to the first order to be sequentially presentable on one or more secondary display devices in response to corresponding requests. Each first slide of the plurality of first slides disposed in succession to a slide produced on the viewing portion is configured to be indicated on an indicative portion of the presenter view interface prior to being produced on the viewing portion. The processor is further configured to display a series of second thumbnails corresponding to a plurality of second slides of an auxiliary file on the presenter view interface of the primary display device. The plurality of second slides being arranged in a second order. The processor is further configured to receive, via the transceiver, an input corresponding to a desired slide from one of the main file or of the auxiliary file to be presented on the viewing portion. Further, the processor is configured to indicate the desired slide on the indicative portion in response to the input and produce the desired slide on the viewing portion to present the desired slide on the one or more secondary display devices in response to an instruction. One or more slides disposed in succession to the desired slide according to one of the first order or the second order is sequentially producible on the viewing portion according to one of the first order or the second order to be sequentially presentable on the one or more secondary display devices in response to corresponding instructions. Each slide of the one or more slides disposed in succession to a slide produced on the viewing portion is configured to be indicated on the indicative portion prior to being produced on the viewing portion.

In another aspect, a method for presenting slides during a live presentation is described. The method includes displaying a series of first thumbnails corresponding to a plurality of first slides of a main file on a presenter view interface on a primary display device. The plurality of first slides being arranged in a first order. The plurality of first slides is sequentially producible on a viewing portion of the presenter view interface according to the first order to be sequentially presentable on one or more secondary display devices in response to corresponding requests. Each first slide of the plurality of first slides disposed in succession to a slide produced on the viewing portion is configured to be indicated on an indicative portion of the presenter view interface prior to being produced on the viewing portion. The method further includes displaying a series of second thumbnails corresponding to a plurality of second slides of an auxiliary file on the presenter view interface of the primary display device. The plurality of second slides being arranged in a second order. Further, the method includes receiving an input corresponding to a desired slide from one of the main file or of the auxiliary file to be presented on the viewing portion, indicating the desired slide on the indicative portion in response to the input, and producing the desired slide on the viewing portion to present the desired slide on the one or more secondary display devices in response to an instruction. One or more slides disposed in succession to the desired slide according to one of the first order or the second order is sequentially producible on the viewing portion according to one of the first order or the second order to be sequentially presentable on the one or more secondary display devices in response to corresponding instructions. Each slide of the one or more slides disposed in succession to a slide produced on the viewing portion is configured to be indicated on the indicative portion prior to being produced on the viewing portion.

In yet another aspect, a method for presenting slides during a live presentation is described. The method includes displaying a series of first thumbnails corresponding to a plurality of first slides of a main file on a presenter view interface on a primary display device. The plurality of first slides being arranged in a first order. The plurality of first slides is sequentially producible on a viewing portion of the presenter view interface according to the first order to be sequentially presentable on one or more secondary display devices in response to corresponding requests. Each first slide of the plurality of first slides disposed in succession to a slide produced on the viewing portion is configured to be indicated on an indicative portion of the presenter view interface prior to being produced on the viewing portion. The method further includes receiving an input corresponding to a first desired slide from the main file to be presented on the viewing portion, indicating the first desired slide on the indicative portion in response to the input, producing the first desired slide on the viewing portion to present the first desired slide on the one or more secondary display devices in response to a first instruction. One or more first slides disposed in succession to the first desired slide according to the first order is sequentially producible on the viewing portion according to the first order to be sequentially presentable on the one or more secondary display devices in response to corresponding instructions. Each slide of the one or more first slides disposed in succession to a slide produced on the viewing portion is configured to be indicated on the indicative portion prior to being produced on the viewing portion.

FIG. 1 illustrates an environment 100 implementing an exemplary system 102 for presenting slides during a live presentation, in accordance with various embodiments. The live presentation corresponds to an event in which a presenter presents or displays the slides to audience members in real-time. The live presentation in an exemplary embodiment is an in-person presentation, a virtual presentation, or a combination of both. The in-person presentation in an exemplary embodiment corresponds to a presentation in which both the presenter and the audience members are in the same location and the slides are presented to the audience members on an external display device such as, a projector or digital monitor. The virtual presentation in an exemplary embodiment corresponds to a presentation in which the presenter is in a geographically separate location from the audience members and the slides are transmitted to respective remote devices of the audience members for display. The slide includes, but is not limited to, one or more of a presentation slide, a video, an animation, or any other multimedia now known or in the future developed. In some embodiments, the presentation slide also includes one or more of an image, a video, an audio file, and an animation.

In addition to the system 102, the environment 100 also includes one or more presenter devices 104, such as, 104-1 and 104-2, communicating with the system 102 over a communication network (not shown). Each of the one or more presenter devices 104 (hereinafter interchangeably referred to as primary display devices) operates as an interface for a corresponding user (hereinafter interchangeably referred to as the presenter) such that the presenter can view a slide currently being presented to the audience, preview the next slide to be displayed to the audience, select the slide to be presented to the audience, and the like. Each of the one or more presenter devices 104 also operates as an interface for the presenter for interacting with the system 102. Each presenter utilizes a corresponding presenter device 104 to provide or feed one or more system inputs to the system 102 and receive one or more system outputs from the system 102. Although not illustrated, a person skilled in the art would appreciate that the communication network can include, but not limited to, a wide area network (WAN) (for example, a transport control protocol/internet protocol (TCP/IP) based network), a cellular network, or a local area network (LAN) employing any of a variety of communications protocols as is now known or in the future developed.

The environment 100 further includes one or more audience devices 106, such as, 106-1 and 106-2, communicatively coupled to the corresponding presenter devices 104, such as, 104-1 and 104-2, through a wired or wireless connection (not shown). The wired connection in an exemplary embodiment includes a cable connection, such as a universal serial bus (USB) connection, a High-Definition Media Interface (HDMI) connection, a Video Graphics Array (VGA) connection or any other wired connection now known or in the future developed. The wireless connection in an exemplary embodiment includes a wireless fidelity (Wi-Fi) connection, a Bluetooth connection, a communication network connection, or any other wireless connection now known or in the future developed. Although not illustrated, a person skilled in the art would appreciate that the communication network connection can include, but not limited to, a wide area network (WAN) (for example, a transport control protocol/internet protocol (TCP/IP) based network) connection, a cellular network connection, or a local area network (LAN) connection employing any of a variety of communications protocols, as is now known or in the future developed.

The audience devices 106 (hereinafter interchangeably referred to as secondary displays) include a projector, a digital monitor, a computing device, or any display screen now known or in the future developed capable of displaying the slides received from the presenter device 104, during the live presentation. The audience device 106 in an exemplary embodiment is locally or remotely located with respect to the presenter device 104. For example, as shown in FIG. 1, when the live presentation is an in-person presentation, the presenter device 104-1 is coupled to a local audience device 106, such as, an external display device 106-1, for example, via a Wi-Fi connection 144. When the live presentation is a virtual presentation, the presenter device 104-2 is operatively coupled to a remote audience device 106, such as, a remote computing device 106-2, for example, via a WAN connection 142.

Each of the one or more audience devices 106 operates as an interface for corresponding one or more audience members for viewing the slides presented by the presenter device 104. The audience device 106 is configured to receive and present a portion of an interface (for example, a viewing portion of a presenter view interface) of the corresponding presenter device 104 to its audience members. In accordance with various embodiments, the viewing portion of the presenter view interface displays the slide currently being presented by the presenter during the live presentation. Further details related to the viewing portion and the presenter view interface of the presenter device 104 will be further described with reference to FIGS. 7 through 10. In some embodiments, the audience members utilizes the audience device 106, such as, the remote computing device 106-2, to provide one or more inputs, such as, reactions, feedback, or the like, associated with the slides, to the presenter device 104.

Figure 2:
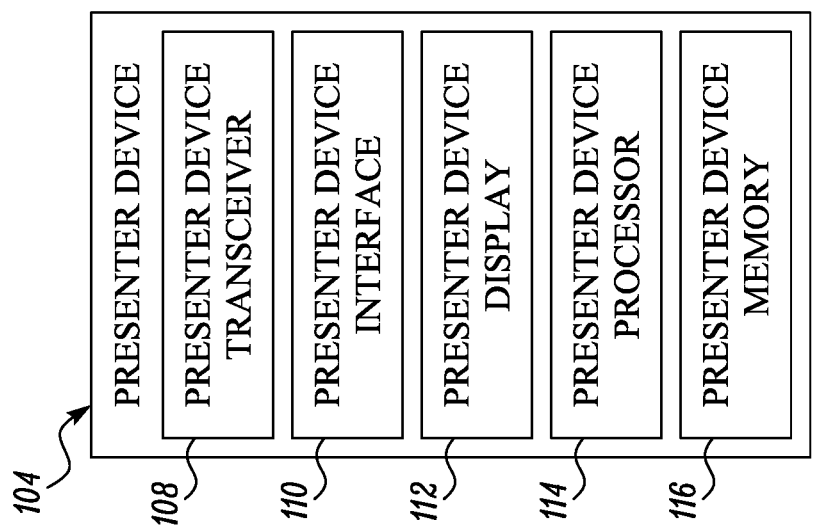
FIG. 2 illustrates a block diagram of an exemplary presenter device, in accordance with some embodiments.

The various components of the presenter device 104 will now be described with reference to FIG. 2. It should be appreciated by those of ordinary skill in the art that FIG. 2 depicts the presenter device 104 in a simplified manner and a practical embodiment may include additional or lesser components and suitably configured logic to support known or conventional operating features that are not described in detail herein. It will further be appreciated by those of ordinary skill in the art that the presenter device 104 is one or more of a personal computer, desktop computer, tablet, smartphone, or any other computing device now known or developed in the future. Each presenter device 104 includes a plurality of electrical and electronic components, providing power, operational control, communication, and the like, within the presenter device 104.

Further, although the presenter device 104 is shown and described to be implemented within a single computing device, it may be contemplated that the one or more components of the presenter device 104 can alternatively be implemented in a distributed computing environment, without deviating from the scope of the claimed subject matter. It will further be appreciated by those of ordinary skill in the art that the presenter device 104 alternatively can function within a remote server, cloud computing device, or any other local or remote computing mechanism now known or developed in the future.

The presenter device 104 includes, among other components, a presenter device transceiver 108, a presenter device interface 110, a presenter device display 112, a presenter device processor 114, and a presenter device memory 116. The components of the presenter device 104, including the presenter device transceiver 108, the presenter device interface 110, the presenter device display 112, the presenter device processor 114, and the presenter device memory 116, cooperate with one another to enable operations of the presenter device 104. Each component can communicate with one another via a local interface (not shown). The local interface can be, for example, but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface can include address, control, and/or data connections to enable appropriate communications among the aforementioned components.

As illustrated, the presenter device 104 in the exemplary embodiment includes the presenter device transceiver 108 to provide the one or more system inputs to and receive the one or more system outputs from the system 102. The presenter device transceiver 108 is further configured to transmit the slides presented in the viewing portion of the presenter view interface to the audience device 106. In accordance with various embodiments, the viewing portion of the presenter view interface is the only portion of the presenter view interface presentable on the one or more audience devices 106. In some embodiments, the presenter device transceiver 108 is configured to receive the one or more inputs, such as, reactions, feedback, or the like, associated with the slides, from the audience device 106. The presenter device transceiver 108 includes a transmitter circuitry and a receiver circuitry to enable the presenter device 104 to communicate data to and acquire data from other devices, such as the system 102 and the audience device 106. In this regard, the transmitter circuitry includes any appropriate circuitry, now known or in the future developed, to provide the one or more system inputs, such as, but not limited to, the slides, one or more inputs associated with selection of a desired slide, presentation of a desired slide, and the like, to the system 102. The transmitter circuitry further also provides the slides presented in the viewing portion of the presenter view interface to the audience device 106. Similarly, the receiver circuitry includes any appropriate circuitry, now known or in the future developed, to receive the one or more system outputs, such as, but not limited to, instructions associated with the presentation of the desired slide, from the system 102. The receiver circuitry further receives the one or more inputs such as, reactions, feedback, or the like, associated with the slides, from the audience device 106. It will be appreciated by those of ordinary skill in the art that the presenter device 104 can include a single presenter device transceiver 108 as shown, or alternatively separate transmitting and receiving components, for example, but not limited to, a transmitter, a transmitting antenna, a receiver, and a receiving antenna.

The presenter device interface 110 is configured to receive input from and/or to provide output to the presenter. The input can be provided via, for example, a keyboard, a touch screen display (such as, the presenter device display 112), a touchpad, a microphone, a recorder, and/or a mouse or any other user input mechanism now known or developed in the future. The output can be provided via an output device, such as the presenter device display 112, a speaker (not shown), or any other output mechanism now known or developed in the future. The presenter device interface 110 can further include, for example, a serial port, a parallel port, an infrared (IR) interface, a universal serial bus (USB) interface and/or any other interface herein known or developed in the future.

The presenter device interface 110 includes a presenter view interface 140 (as shown in FIGS. 7 through 10) through which the presenter communicates to and from the system 102 and/or the audience device 106. The presenter view interface 140 can be an application or web portal or any other suitable interface, now known or in the future developed, for presentation of the slides during the live presentation. As shown in FIGS. 7 through 10, the presenter view interface 140 includes one or more series 700, 702, 714, 716 of a plurality of thumbnails corresponding to the slides. For example, the plurality of thumbnails include a series 700 of first thumbnails corresponding to a plurality of first slides of a main file. In accordance with various embodiments, the main file corresponds to a file having slides arranged in a first order that the presenter intends to present during the live presentation. For example, the main file can include the slides that are directly relevant to the topic of the live presentation. In an example illustrated in FIGS. 7 through 10, the main file includes slides related to various facilities provided at an assistant living facility. The first thumbnails are arranged in the first order in the presenter view interface 140. In accordance with various embodiments, the plurality of first slides are configured to be sequentially producible on the viewing portion 708 of the presenter view interface 140 according to the first order in response to requests from the presenter.

In some embodiments, the plurality of thumbnails further include one or more series 702, 714, 716 of second thumbnails corresponding to a plurality of second slides of one or more auxiliary files. In accordance with various embodiments, each auxiliary file corresponds to a file having slides, arranged in a second order, that the presenter may be required to present in certain circumstances, for example, to address a query during the live presentation. For example, the auxiliary file includes the slides that include further details related to the topic of the live presentation. In the illustrated example, the auxiliary file (for example, TAB 1 file, shown in FIGS. 7 through 10) includes slides providing further details related to rooms provided at the assistant living facility. In the illustrated example, the auxiliary file (for example, TAB 2 file, shown in FIGS. 7 through 10) includes slides providing further details related to entertainment facilities provided at the assistant living facility. The examples related to the assistant living facility are merely provided for illustrative purposes and the slides of the main file and the one or more auxiliary files can include any other content. Each of the series of the second thumbnails of the auxiliary files TAB 1 and TAB 2 are arranged in a second order in the presenter view interface 140. In some examples, the auxiliary file (for example, Relief Slides file, shown in FIGS. 7 through 10) includes general slides that are not related to any topic of the live presentation. The relief slides in some embodiments include, for example, a logo, a video, or a blank slide, that is available to be selected by the presenter for presenting to the audience when the presenter is searching for a file or addressing a topic not covered by the slides displayed on the presenter view interface 140. In accordance with various embodiments, each of the plurality of second slides are configured to be sequentially producible on the viewing portion 708 of the presenter view interface 140 according to the second order in response to requests from the presenter.

The presenter view interface 140 further includes the viewing portion 708 for displaying a slide that is currently being presented (hereinafter referred to as current slide) by the presenter. The current slide corresponds to any slide from the main file or the one or more auxiliary files. The presenter view interface 140 further includes an indicative portion 710 to provide a preview of a next slide that is to be presented in succession to the current slide, prior to being produced on the viewing portion 708. In accordance with various embodiments, the next slide is a slide disposed in succession to the current slide produced on the viewing portion 708 or any slide selected by the presenter (and not necessarily disposed in succession to the current slide) from the main file or the one or more auxiliary files.

In some embodiments, as shown in FIGS. 7 through 10, the area defined by the viewing portion 708 is equal in size to an area defined by the indicative portion 710. The similarity in the sizes of the viewing portion 708 and the indicative portion 710 makes it convenient for the presenter to view the current slide and the next slide presented in the respective portions 708, 710. This avoids any inconvenience associated with viewing the current slide and the next slide in two different sizes. In some alternative embodiments, the area defined by the viewing portion 708 is different in size from the area defined by the indicative portion 710, and the sizes of one or more of said areas can be changed based on the preference of the user.

In some embodiments, the presenter view interface 140 includes a teleprompter window 712 to display notes associated with each slide produced on the viewing portion 708. In some embodiments, the presenter view interface 140 also includes one or more search boxes, such as, keyword search box 704 and slide number search box 706, to search for one or more desired slides from the main file or the one or more auxiliary files.

In accordance with various embodiments, one or more portions of the presenter view interface 140 are customizable based on a preference of the presenter. The customization includes changing size or position of the one or more portions, such as, the series 700, 702, 714, 716, the viewing portion 708, the indicative portion 710, the teleprompter window 712, and the search boxes 704, 706, of the presenter view interface 140. In some embodiments, the customization includes omission of display of the one or more portions of the presenter view interface 140 on the presenter device 104.

Referring back to FIG. 2, the presenter device display 112 is configured to display data, slides, images, and the like. The presenter device display 112 includes, for example, any display screen or a computer monitor now known or developed in the future. In accordance with some embodiments, the presenter device display 112 is configured to display the presenter view interface 140 (shown in FIGS. 7 through 10) associated with presentation of the slides during the live presentation.

The presenter device memory 116 is a non-transitory memory configured to store a set of instructions that are executable by the presenter device processor 114 to perform predetermined operations. For example, the presenter device memory 116 can include any of the volatile memory elements (for example, random access memory (RAM), non-volatile memory elements (for example, read only memory (ROM)), and combinations thereof. Moreover, the presenter device memory 116 can incorporate electronic, magnetic, optical, and/or other types of storage media. In some embodiments, the presenter device memory 116 is also configured to store files, such as but not limited to, the main file, the one or more auxiliary files, and a sequence of production of the slides on the viewing portion 708.

The presenter device processor 114 is configured to execute the instructions stored in the presenter device memory 116 to perform the predetermined operations, for example, the detailed functions of the presenter device 104 as will be described hereinafter. The presenter device processor 114 can include one or more microprocessors, microcontrollers, DSPs (digital signal processors), state machines, logic circuitry, or any other device or devices that process information or signals based on operational or programming instructions. The presenter device processor 114 can be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed. The presenter device processor 114 is configured to cooperate with other components of the presenter device 104 to perform operations pursuant to communications and one or more instructions from the system 102.

Referring back to FIG. 1, the system 102 is configured to present the slides during the live presentation. The system 102 can be electrically and/or communicatively coupled to a variety of devices, such as, the presenter device 104. In some embodiments, the system 102 includes a plurality of electrical and electronic components, providing power, operational control, communication, and the like within the system 102. For example, the system 102 includes, among other things, a system transceiver 120, a system processor 122, a system memory 124, and a system interface 126.

It should be appreciated by those of ordinary skill in the art that FIG. 1 depicts the system 102 in a simplified manner and a practical embodiment can include additional or lesser components and suitably configured logic to support known or conventional operating features that are not described in detail herein. It will further be appreciated by those of ordinary skill in the art that the system 102 can be a personal computer, desktop computer, tablet, smartphone, or any other computing device now known or developed in the future.

Further, although the system 102 is shown and described to be implemented within a single computing device, it may be contemplated that the one or more components of the system 102 can alternatively be implemented in a distributed computing environment, without deviating from the scope of the claimed subject matter. It will further be appreciated by those of ordinary skill in the art that the system 102 alternatively can function within a remote server, cloud computing device, or any other remote computing mechanism now known or developed in the future. For example, the system 102, in some embodiments, can be a cloud environment incorporating the operations of the system transceiver 120, the system processor 122, the system memory 124, and the system interface 126, and various other operating modules to serve as a software as a service model for the presenter devices 104. In some embodiments, the system 102 and the presenter device 104 can be implemented in a single device to perform the functions of both the system 102 and the presenter device 104, as will be described hereinafter. In some embodiments, one or more components of the system 102 can be implemented in the presenter device 104 and one or more or all of the remaining components of the system 102 can be implemented within a remote server or the system 102 itself.

The components of the system 102, including the system transceiver 120, the system processor 122, the system memory 124, and the system interface 126 can communicate with one another via a local interface (not shown). The local interface can be, for example, but not limited to, one or more buses or other wired or wireless connections, as is known in the art. The local interface can have additional elements, but not limited to, such as controllers, buffers (caches), drivers, repeaters, and receivers, among many others, to enable communications. Further, the local interface can include address, control, and/or data connections to enable appropriate communications among the aforementioned components.

The system transceiver 120 includes a transmitter circuitry and a receiver circuitry (not shown) to enable the system 102 to communicate data to and acquire data from other devices such as the presenter devices 104. In this regard, the transmitter circuitry can include any appropriate circuitry, now known or in the future developed, to transmit data such as, but not limited to, presentation of the desired slide. Similarly, the receiver circuitry can include any appropriate circuitry, now known or in the future developed, to receive data such as, but not limited to, the main file, the one or more auxiliary files, the sequence of production of slides, selection of the desired slide, and the like. The transmitter circuitry and the receiver circuitry together form a wireless transceiver to enable wireless communication with the presenter device 104. It will be appreciated by those of ordinary skill in the art that the system 102 can include a single system transceiver 120 as shown, or alternatively separate transmitting and receiving components, for example but not limited to, a transmitter, a transmitting antenna, a receiver, and a receiving antenna.

The system memory 124 is a non-transitory memory configured to store a set of instructions that are executable by the system processor 122 to perform the predetermined operations. For example, the system memory 124 can include any of the volatile memory elements (for example, random access memory (RAM), nonvolatile memory elements (for example read only memory (ROM)), and combinations thereof. Moreover, the system memory 124 can incorporate electronic, magnetic, optical, and/or other types of storage media. In some embodiments, the system memory 124 is also configured to store files, such as, but not limited to, the main file, the one or more auxiliary files, and a sequence of production of the slides on the viewing portion 708.

The system processor 122 is configured to execute the instructions stored in the system memory 124 to perform the predetermined operations, for example, the detailed functions of the system 102 as will be described hereinafter. The system processor 122 can include one or more microprocessors, microcontrollers, DSPs (digital signal processors), state machines, logic circuitry, or any other device or devices that process information or signals based on operational or programming instructions. The system processor 122 can be implemented using one or more controller technologies, such as Application Specific Integrated Circuit (ASIC), Reduced Instruction Set Computing (RISC) technology, Complex Instruction Set Computing (CISC) technology or any other similar technology now known or in the future developed.

The system interface 126 is configured to receive input from and/or to provide output to one or more users of the system 102. The input can be provided via, for example, a keyboard, a touch screen display, a touchpad, a microphone, and/or a mouse or any other user input mechanism now known or developed in the future. The output can be provided via an output device such as a display, a speaker, or any other output mechanism now known or developed in the future. The system interface 126 can further include, for example, a serial port, a parallel port, an infrared (IR) interface, a universal serial bus (USB) interface and/or any other interface herein known or developed in the future.

Figure 3:
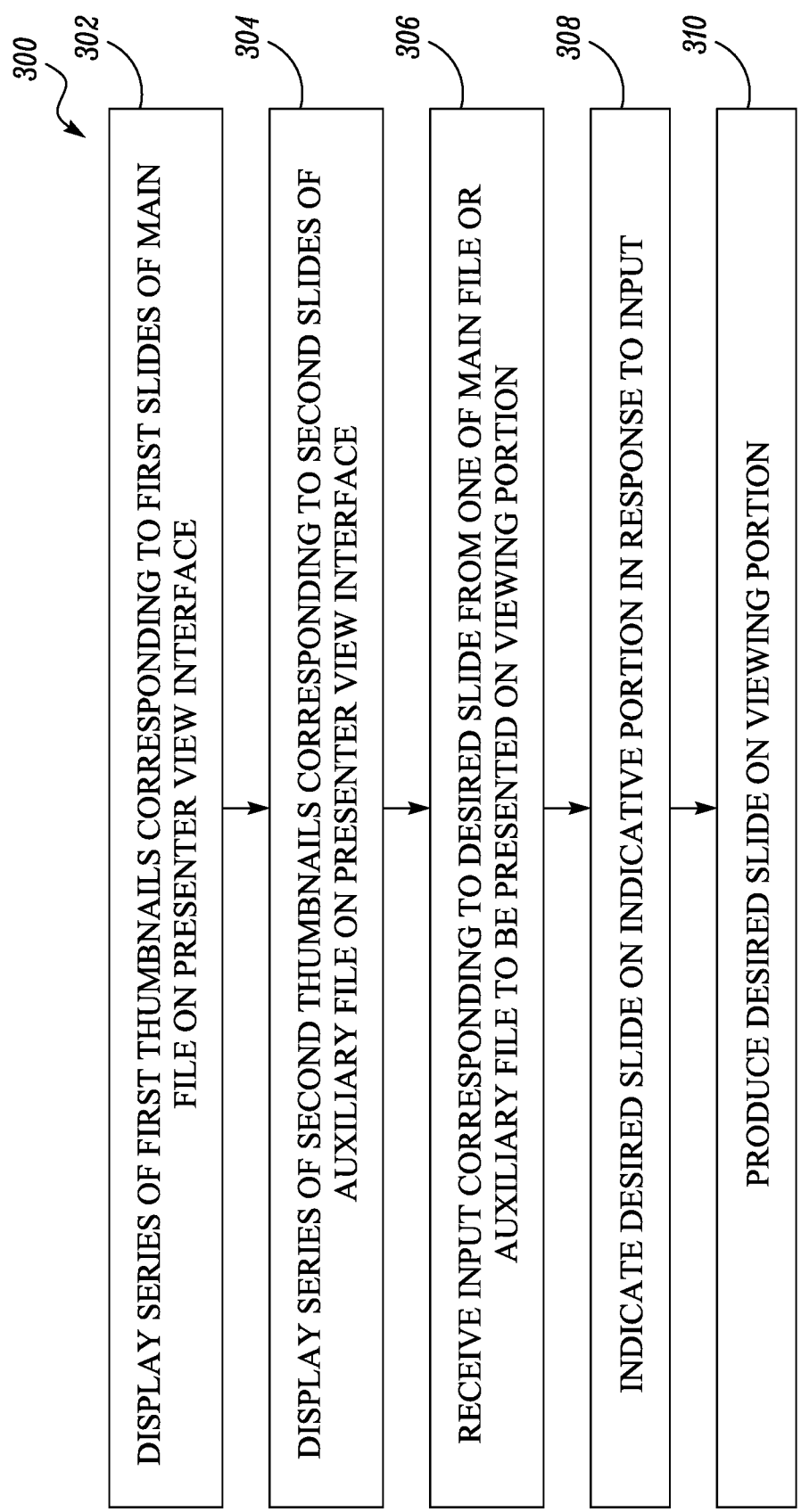
FIG. 3 illustrates an exemplary method for presenting the slides during the live presentation, in accordance with some embodiments.

FIG. 3 illustrates a method 300 for presenting the slides during the live presentation. At 302, the method begins with the system 102 displaying the series 700 (shown in FIGS. 7 through 10) of first thumbnails corresponding to the plurality of first slides of the main file on the presenter view interface 140 of the presenter device 104. The first thumbnails are arranged in the first order on the presenter view interface 140. As discussed above, the main file corresponds to a file having slides arranged in the first order that the presenter intends to present during the live presentation. In some embodiments, prior to displaying the series 700 of first thumbnails corresponding to the plurality of first slides of the main file on the presenter view interface 140, the system 102 receives, via the system transceiver 120, the main file including the plurality of first slides arranged in the first order from the presenter device 104.

Figure 4:
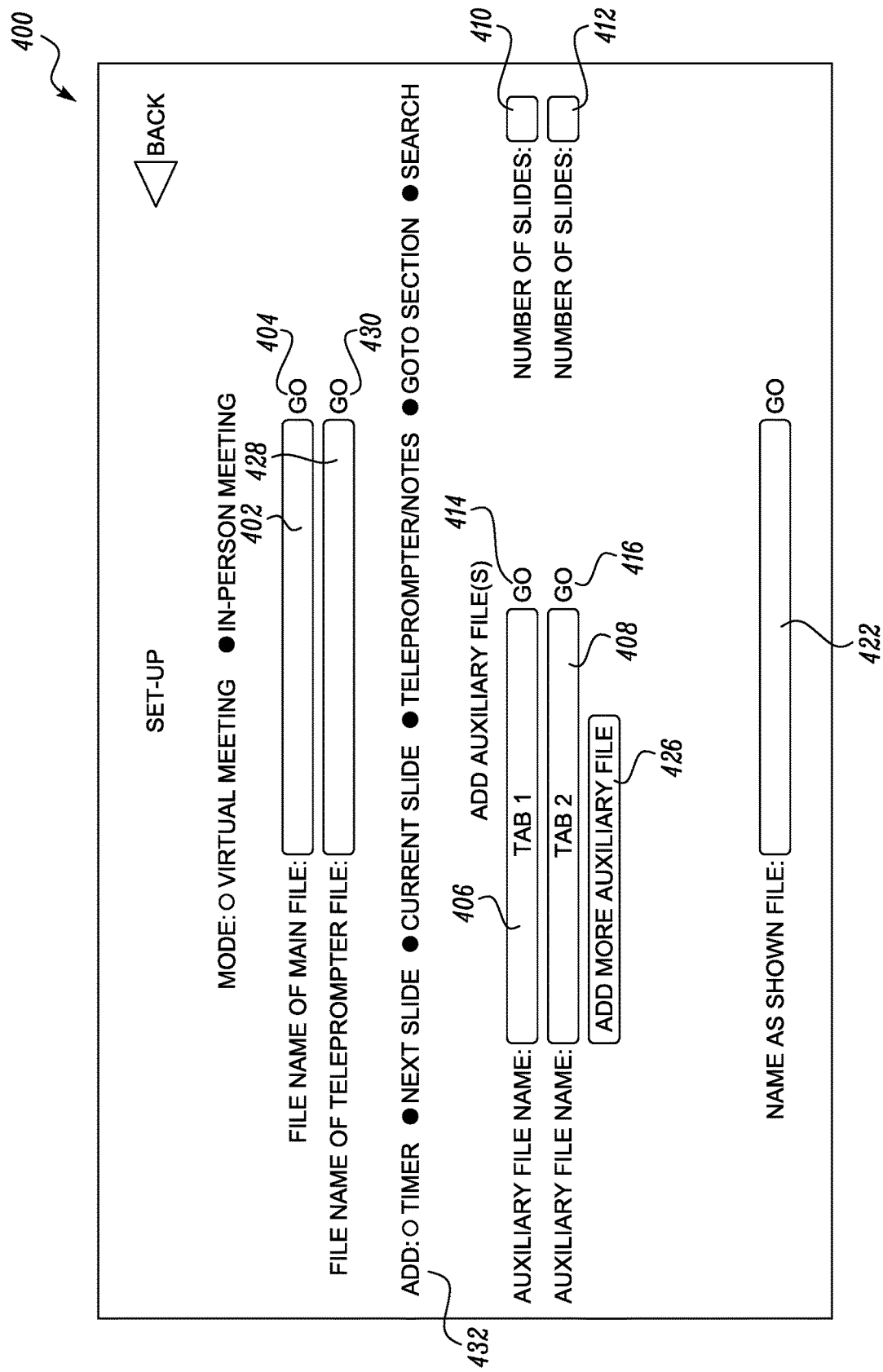
FIG. 4 illustrates a set-up window displayed on the presenter device, in accordance with some embodiments.

In an exemplary embodiment shown in FIG. 4, the system 102 displays a set-up window 400 on the presenter device display 112 to receive the plurality of first slides of the main file from the presenter device 104. As shown in FIG. 4, the set-up window 400 includes a graphical field 402 to enter the file name of the main file to be presented during the live presentation. Upon entering the file name of the main file in the graphical field 402 and selection of the 'GO' icon 404 corresponding to the graphical field 402, the system 102 identifies the main file corresponding to the entered file name and obtains the plurality of first slides of the main file from the presenter device memory 116 of the presenter device 104. Upon receiving the plurality of first slides, the system 102 displays the series 700 of first thumbnails corresponding to the plurality of first slides in the first order of the main file on the presenter view interface 140 of the presenter device 104, as shown in FIGS. 7 through 10.

In accordance with various embodiments, the plurality of first slides is sequentially producible on the viewing portion 708 of the presenter view interface 140 according to the first order, to be sequentially presentable on the one or more audience devices 106, in response to corresponding requests from the presenter device 104. Further, each first slide of the plurality of first slides disposed in succession to a slide produced on the viewing portion 708 is indicated on the indicative portion 710 of the presenter view interface 140, prior to being produced on the viewing portion 708.

Referring back to FIG. 3, in some embodiments, at 304, the system 102 displays the one or more series 702, 714, 716 of second thumbnails corresponding to the plurality of second slides of the one or more auxiliary files on the presenter view interface 140 of the presenter device 104. The second thumbnails are arranged in the second order on the presenter view interface 140. As discussed above, the one or more auxiliary files correspond to the files having slides, arranged in the second order, that the presenter is required to present in certain circumstances, for example, to address a query during a question and answer (Q&A) session of the live presentation. In some embodiments, prior to displaying the one or more series 702, 714, 716 of second thumbnails corresponding to the plurality of second slides of the one or more auxiliary files on the presenter view interface 140, the system 102 receives, via the system transceiver 120, the one or more auxiliary files including the plurality of second slides arranged in the second order from the presenter device 104.

To this end, the system 102 receives the one or more auxiliary files from the presenter device 104, via the set-up window 400. In an exemplary embodiment, the system 102 enables the presenter device 104 to enter the file names of the one or more auxiliary files on the set-up window 400 to allow the system 102 to identify the one or more auxiliary files corresponding to the entered file names and obtain the plurality of second slides of the one or more auxiliary files from the presenter device memory 116 of the presenter device 104, in the manner as discussed above for the main file.

Figure 5:
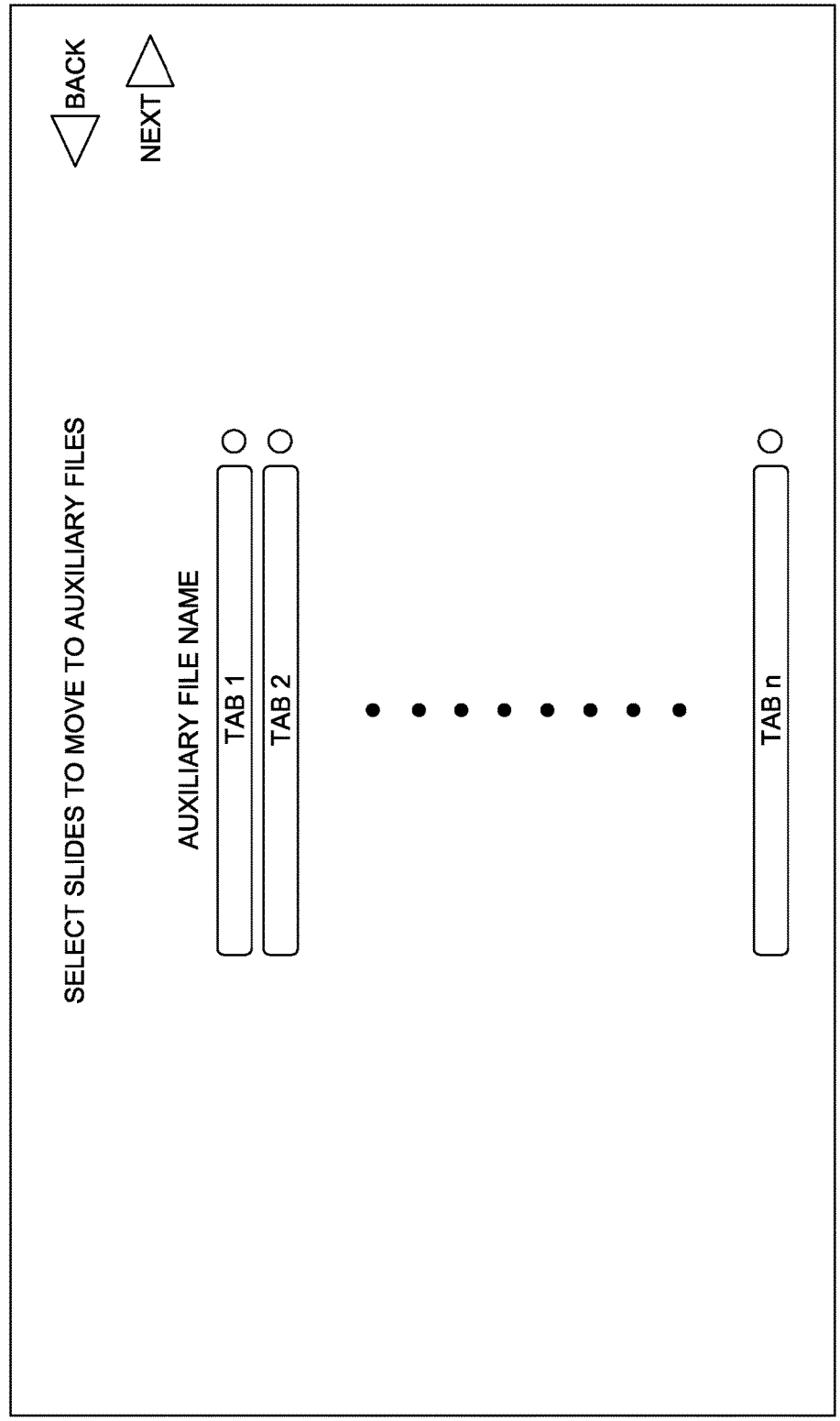
FIG. 5 illustrates a selection window displayed on the presenter device, in accordance with some embodiments.
Figure 6:
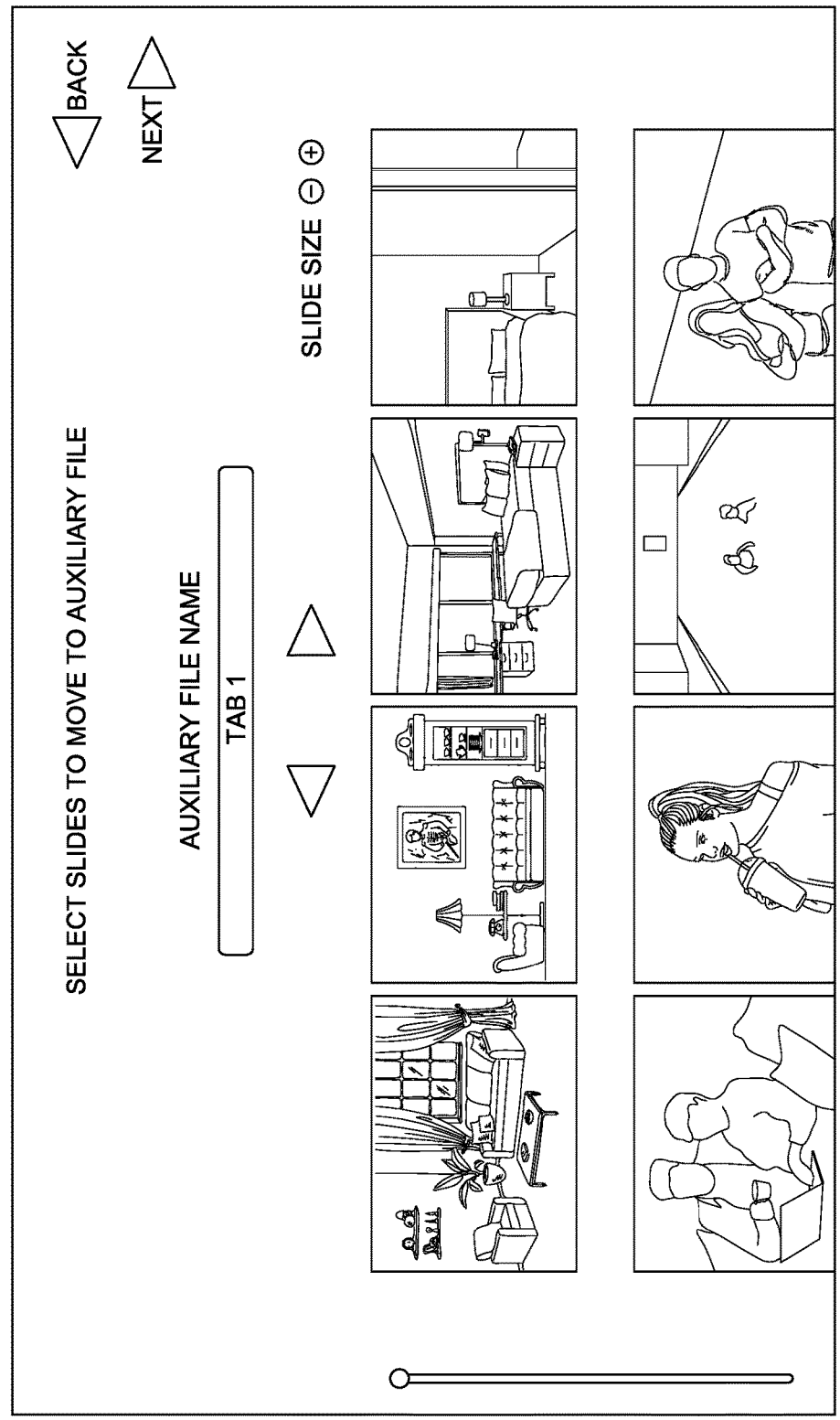
FIG. 6 illustrates a slide selection window displayed on the presenter device, in accordance with some embodiments.

Alternatively, as shown in FIG. 4, the system 102 enables the presenter device 104 to create the one or more auxiliary files by selecting one or more second slides stored in the presenter device memory 116 of the presenter device 104. To this end, the set-up window 400, in an exemplary embodiment, includes graphical fields 406 and 408 to define the file names for the one or more auxiliary files, that are to be created. In some embodiments, upon defining the names of the one or more auxiliary files (for example, TAB 1 and TAB 2), the system 102 prompts the presenter device 104 to enter a number of slides that are to be displayed on the presenter view interface 140 for each of the one or more auxiliary files in the graphical fields 410 and 412, respectively. Upon selection of 'GO' icons 414 and 416 on the set-up window 400, the system 102 creates the one or more auxiliary files (for example, TAB 1 and TAB 2) with the file names entered by the presenter device 104. The system 102 then proceeds to display a selection window 500 (as shown in FIG. 5) that lists the file names (for example, TAB 1 and TAB 2) of the created one or more auxiliary files and prompts the presenter device 104 to select a file name (for example, TAB 1) corresponding to an auxiliary file in which the presenter wishes to add the one or more second slides. Upon receiving the selection, the system 102 displays a slide selection window 600 (as shown in FIG. 6) that enables the presenter to select the one or more second slides to be included in the auxiliary file (for example, TAB 1). The process is repeated for each auxiliary file created in the set-up window 400. In some cases, the system 102 prompts the presenter device 104 to keep selecting the second slides for inclusion in the auxiliary file until the number of slides selected in the slide selection window 600 matches the number of slides defined in the set-up window 400 for each auxiliary file. Upon receiving the plurality of second slides, the system 102 displays the series 702, 714, 716 of second thumbnails corresponding to the plurality of second slides in the second order of the one or more auxiliary files (for example, TAB 1 and TAB 2) on the presenter view interface 140 of the presenter device 104, as shown in FIGS. 7 through 10. In some embodiments, the system 102 enables the presenter to add more tabs by selecting the graphical field 426 to add more auxiliary files, such as, the relief slides file, in the same manner as discussed above. The illustrated interfaces associated with the set-up window 400, the selection window 500, and the slide selection window 600 are purely exemplary and provided for illustrative purposes and the interfaces can include any other configuration.

In some embodiments, the system 102 enables the presenter, via the presenter device 104, to associate different colors with the different series 702, 714, 716 of thumbnails associated with different auxiliary files. The association of colors with the thumbnails, for example, the boundaries of the thumbnails or the boundaries of the series 702, 714, 716 of thumbnails, allows the presenter to quickly navigate between the different sets of thumbnails associated with different auxiliary files. For example, the system 102 enables the presenter to associate 'BLUE' color with the series 702 of the second thumbnails associated with the auxiliary file TAB 1 showing images of the rooms of the assistant living facility and associate 'RED' color with the series 714 of the second thumbnails associated with the auxiliary file TAB 2 showing images of the entertainment facility provided at the assistant living facility, to enable the presenter to quickly differentiate between the two series 702 and 714.

In accordance with various embodiments, each of the plurality of second slides is sequentially producible on the viewing portion 708 of the presenter view interface 140 according to the second order to be sequentially presentable on the one or more audience devices 106 in response to corresponding requests. Each second slide of the plurality of second slides disposed in succession to a slide produced on the viewing portion 708 is indicated on the indicative portion 710 of the presenter view interface 140, prior to being produced on the viewing portion 708.

Returning to FIG. 3, at 306, the system 102 receives an input corresponding to a desired slide from one of the main file or one or more of the auxiliary files to be presented on the viewing portion 708 of the presenter view interface 140. In accordance with various embodiments, the input corresponds to a selection of a thumbnail from the first thumbnails corresponding to the plurality of first slides of the main file or the second thumbnails corresponding to the plurality of second slides of the one or more auxiliary files (for example, TAB 1, TAB 2, Relief slides). The selection can be provided via, for example, a keyboard, a touch screen display (such as, the presenter device display 112), a touchpad, a microphone, a recorder, and/or a mouse or any other user input mechanism now known or developed in the future.

In some embodiments, receiving an input corresponding to the desired slide includes performing a search for the desired slide using the keyword search box 704 or the slide number search box 706 (see FIGS. 7 through 10), and detecting a selection of the desired slide from the search results. For example, the system 102 receives a keyword-based query in the keyword search box 704 of the presenter view interface 140 to identify the desired slide from the plurality of first slides or the plurality of second slides. In such cases, the system 102 identifies the desired slide or any other identifier based on the notes, images, or text associated with the slides of the plurality of first slides or the plurality of second slides. For example, the system 102 compares the keyword-based query with the notes, images, or text associated with the slides of the plurality of first slides or the plurality of second slides and display the one or more slides having the notes, images, or text matching the keyword-based query for selection of the desired slide.

In some embodiments, the system 102 receives a slide number and the file name (for example, the main file name or the one or more auxiliary file names) associated with the desired slide in the slide number search box 706 of the presenter view interface 140 to identify the desired slide. The slide number in an exemplary embodiment corresponds to a sequence number of the slide within the main file or the one or more auxiliary files. For example, the system 102 receives a request to identify an $n^{th}$ slide of the auxiliary file TAB 2. In such cases, the system 102 identifies the $n^{th}$ slide of the auxiliary file TAB 2, for example, by highlighting the $n^{th}$ slide, for receiving the input from the presenter.

At 308, upon receiving the input, the system 102 indicates the desired slide on the indicative portion 710 of the presenter view interface 140. The indication of the desired slide on the indicative portion 710 of the presenter view interface 140 allows the presenter to view the desired slide and its content, before the desired slide is produced on the viewing portion 708 and the audience device 106.

At 310, the system 102 produces the desired slide on the viewing portion 708 to present the desired slide on the one or more audience devices 106 in response to an instruction. The one or more slides disposed in succession to the desired slide according to one of the first order or the second order is sequentially producible on the viewing portion 708 according to one of the first order or the second order to be sequentially presentable on the one or more audience devices in response to corresponding instructions. Each slide of the one or more slides disposed in succession to the slide (for example, the desired slide) produced on the viewing portion 708 is configured to be indicated on the indicative portion 710 prior to being produced on the viewing portion 708. The instruction can be provided via, for example, a keyboard, a touch screen display, a touchpad, a microphone, and/or a mouse or any other user input mechanism now known or developed in the future.

Figure 7:
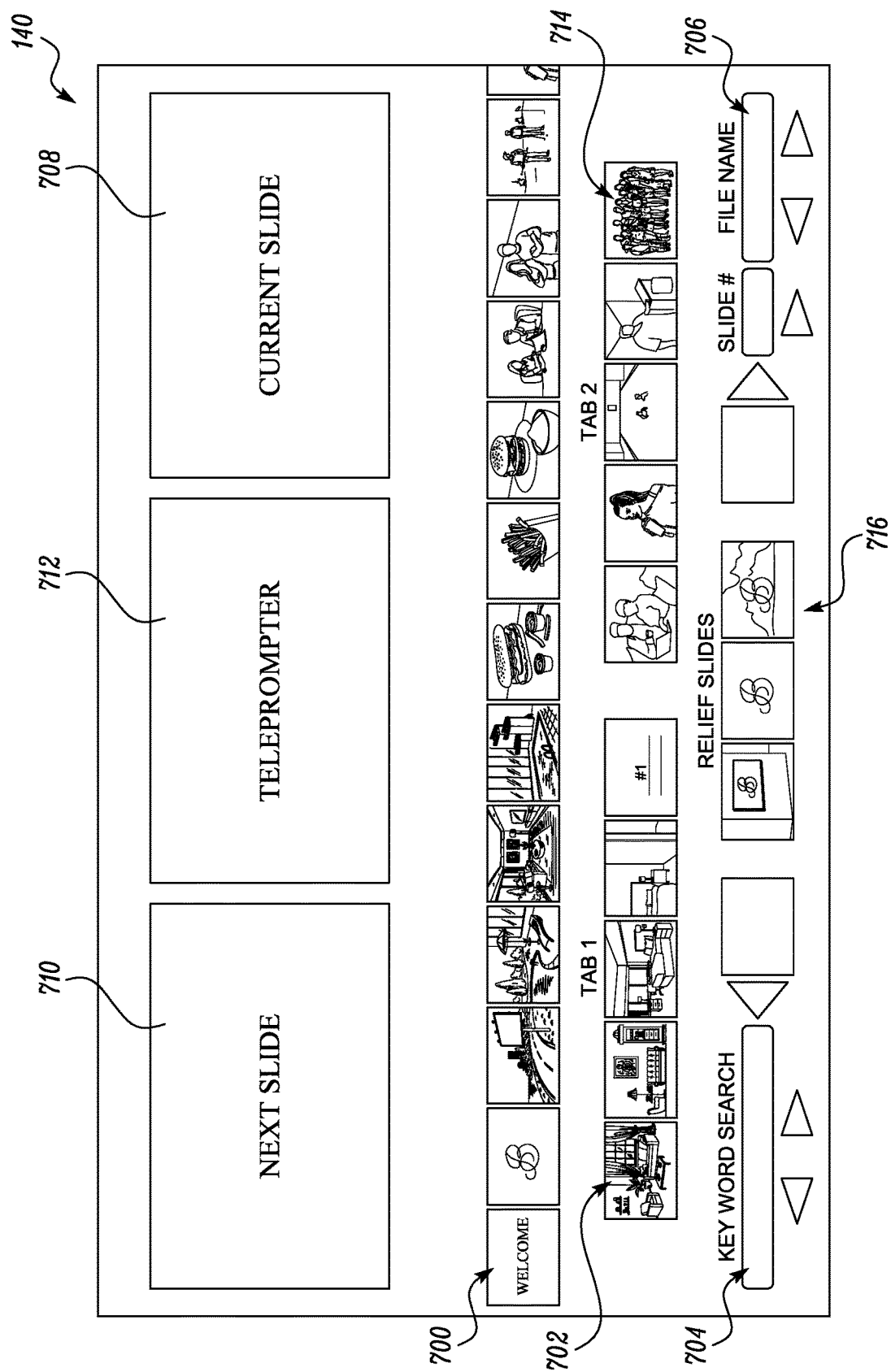
FIGS. 7 through 10 illustrate various stages of a presenter view interface of the presenter device for presenting the slides during the live presentation, in accordance with some embodiments.
Figure 8:
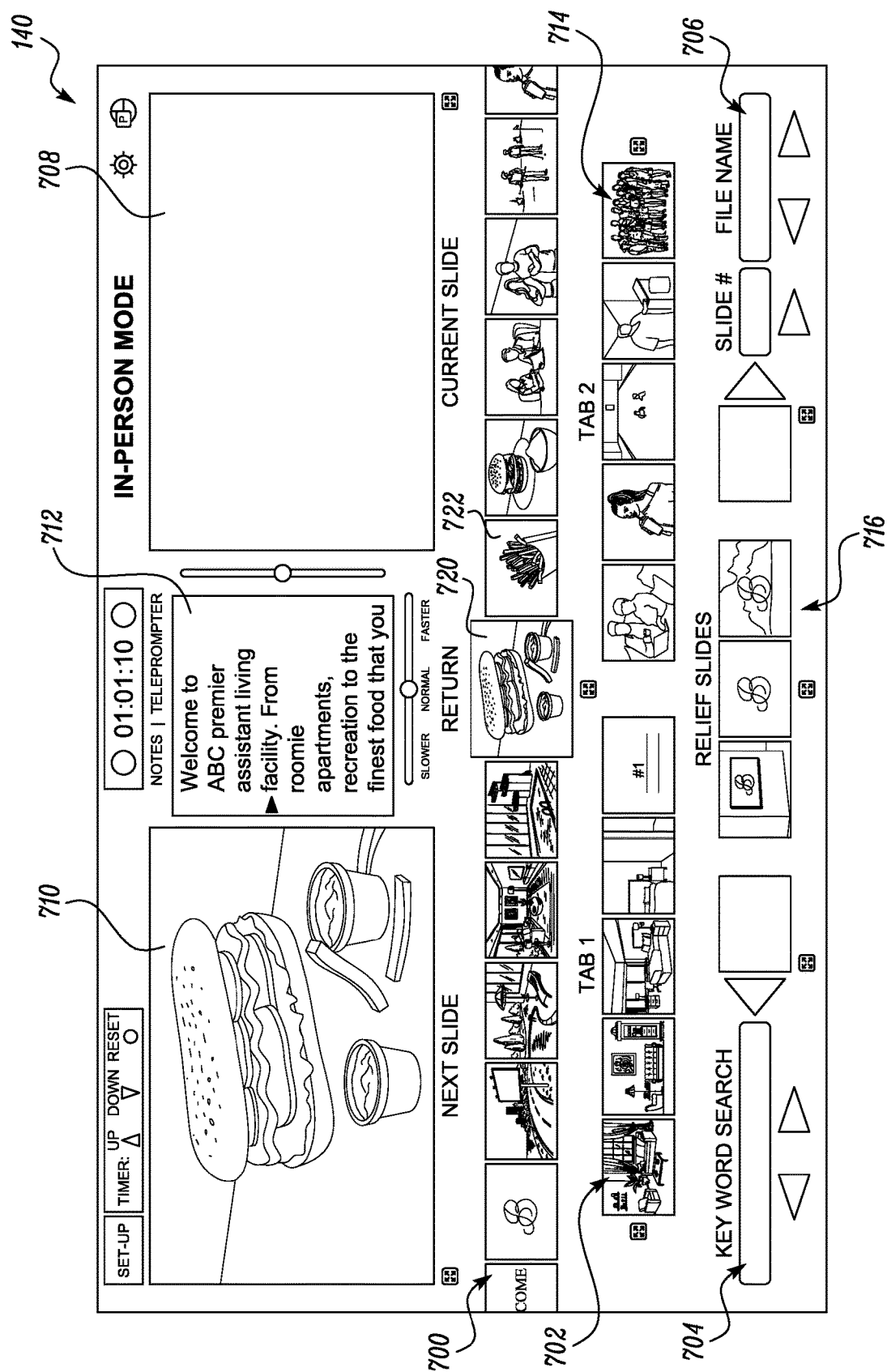
Figure 9:
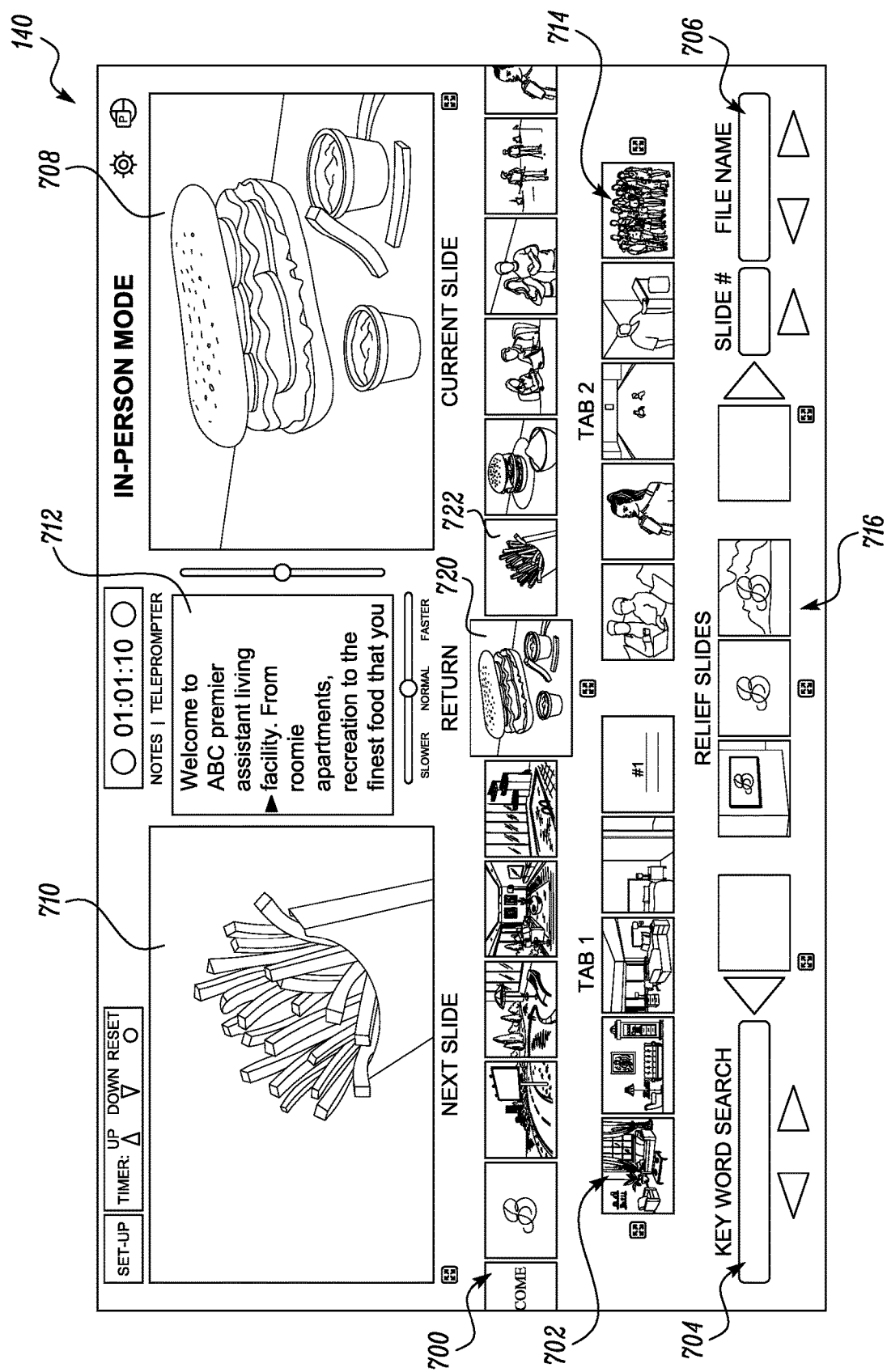

In some embodiments, the system 102 receives the input corresponding to the desired slide before the start of the live presentation. In accordance with various embodiments, before the start of the live presentation, the viewing portion 708 and the indicative portion 710 of the presenter view interface 140 are empty and do not display any slide. FIG. 7 shows the presenter view interface 140 before the start of the live presentation. For example, as shown in FIG. 7, the viewing portion 708 and the indicative portion 710 of the presenter view interface 140 are empty before the start of the live presentation. In such cases, when the system 102 receives the input corresponding to the desired slide, the system 102 indicates the desired slide on indicative portion 710 of the presenter view interface 140. Upon receiving confirmation or a corresponding instruction from the presenter, the system 102 then produces the desired slide on the viewing portion 708 of the presenter view interface 140 and the audience device 106. Once the desired slide is produced on the viewing portion 708 of the presenter view interface 140 and the audience device 106, the system 102 displays a slide disposed in succession to the desired slide produced on the viewing portion 708 on the indicative portion 710. For example, as shown in FIG. 8, the desired slide 720 selected from the main file is first produced on the indicative portion 710 and then on the viewing portion 708, as shown in FIG. 9. Further, as shown in FIG. 9, the system 102 indicates the slide 722 disposed in succession to the desired slide 720 on the indicative portion 710 when the desired slide 720 is produced on the viewing portion 708.

In some embodiments, prior to receiving the input, the system 102 sequentially produces one or more of the plurality of first slides on the viewing portion 708, upon receiving corresponding requests. In other words, the system 102 in an exemplary embodiment, receives the input corresponding to the desired slide during the presentation, for example, when a slide is already displayed in the viewing portion 708 and the indicative portion 710 of the presenter view interface 140. In such cases, when the system 102 receives the input corresponding to the desired slide, the desired slide replaces the slide already indicated on indicative portion 710 of the presenter view interface 140. At this stage, the system 102 does not change the slide that is being produced on the viewing portion 708. Upon receiving confirmation from the presenter, the system 102 then replaces the slide produced on the viewing portion 708 of the presenter view interface 140 and the audience device 106 with the desired slide. Once the desired slide is produced on the viewing portion 708 of the presenter view interface 140 and the audience device 106, the system 102 displays a slide disposed in succession to the desired slide produced on the viewing portion 708 on the indicative portion 710.

In accordance with various embodiments, the system 102 records and stores a sequence of production of the slides on the viewing portion 708 during the live presentation into the system memory 124 and/or the presenter device memory 116. To this end, the system 102 receives, from the presenter device 104, a file name to be associated with the recorded sequence of production of the slides on the viewing portion 708. For example, the file name to be associated with the recorded sequence is received via a graphical field 422 in the set-up window 400. When the input associated with the desired slide is received before the start of the live presentation, the system 102 records and stores a sequence of production of the desired slides and the one or more slides presented in succession to the desired slide on the viewing portion 708. When the input associated with the desired slide is received during the live presentation, the system 102 records and stores a sequence of production of the plurality of first slides, the desired slide, and the one or more slides presented in succession to the desired slide on the viewing portion 708. In accordance with various embodiments, the system 102 does not alter the sequence of the first slides in the main file or the second slides in the one or more auxiliary files and instead creates a new file to store the recorded sequence of slides presented during the live presentation. This enables the presenter to maintain a separate copy of the recorded sequence of slides associated with each live presentation event for record purposes.

Figure 10:
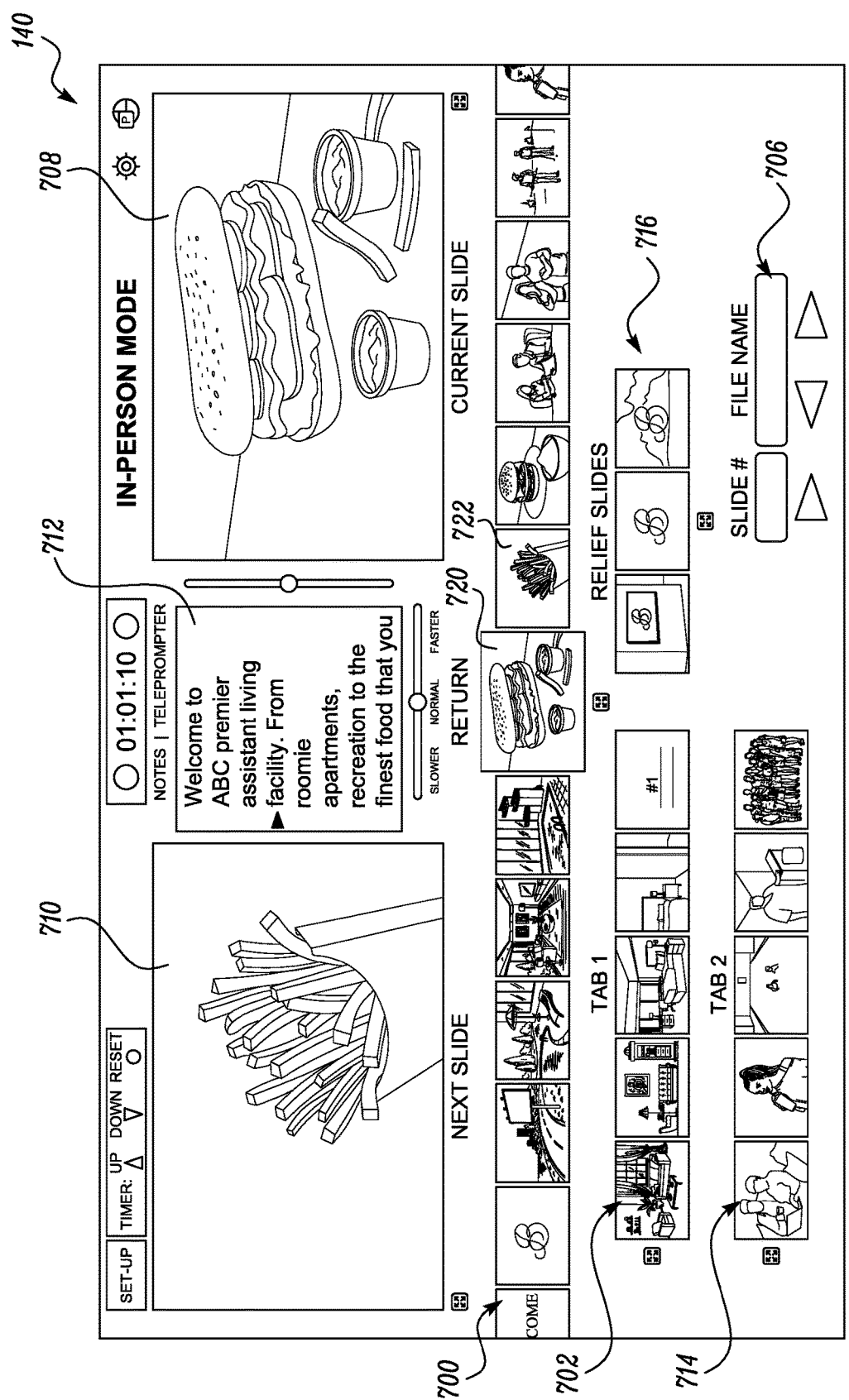

In accordance with various embodiments, the system 102 enables the presenter to customize the presenter view interface 140 of the presenter device 104. To this end, the system 102 receives a request from the presenter, via the presenter device 104, to customize the one or more portions of the presenter view interface 140. The customization includes changing size or position of the one or more portions, such as, the series 700, 702, 714, 716, the viewing portion 708, the indicative portion 710, the teleprompter window 712, and the search boxes 704, 706, of the presenter view interface 140. In some embodiments, the customization includes omission of display of the one or more portions of the presenter view interface 140 on the presenter device 104. Upon receiving the request, the system 102 enables the presenter, via the presenter device 104, to change the position of the one or more portions by performing, for example, drag-and-drop operation, on the one or more portions of the presenter view interface 140. For example, FIG. 10 illustrates the presenter view interface 140 in which the positioning of the portions 702, 714, 716 and 706 are changed based on the preference of the presenter. Similarly, the system 102 enables the presenter, via the presenter device 104, to change the size of the one or more portions, for example, by dragging the boundaries of the one or more portions of the presenter view interface 140. In some embodiments, the system 102 provides an option, for example, via the graphical elements 432 on the set-up window 400 shown in FIG. 4, to enable the user to omit or select the one or more portions that are to be displayed on the presenter view interface 140.

In accordance with various embodiments, the system 102 enables the presenter to display the notes associated with each slide produced on the viewing portion 708 in the teleprompter window 712 of the presenter view interface 140. To this end, the system 102 receives the notes from the presenter device 104, via the set-up window 400. As shown in FIG. 4, the set-up window 400 includes a graphical field 428 to enter the file name having the notes associated with the slides. Upon entering the file name in the graphical field 428 and selection of the 'GO' icon 430 corresponding to the graphical field 428, the system 102 identifies the file having the notes associated with the slides and obtains the notes from the presenter device memory 116 of the presenter device 104. Upon receiving the notes, the system 102 displays the notes in the teleprompter window 712 of the presenter view interface 140 of the presenter device 104, as shown in FIGS. 7 through 10.

In some embodiments, one or more sections of the notes obtained from the presenter device 104 are associated with corresponding one or more slides of the main file and/or the one or more auxiliary files. In such cases, the notes displayed on the teleprompter window 712 follow the slide displayed on the viewing portion 708 of the presenter view interface 140. For example, when the slide 720 (as shown in FIG. 8) is displayed on the viewing portion 708, the system 102 identifies a section of the notes associated with the slide 720 and display the identified section on the teleprompter window 712. In some alternate embodiments, the notes and the slides are not associated with each other. In such cases, the teleprompter window 712 displays the notes at a predefined pace irrespective of the slide being currently displayed in the viewing portion 708 of the presenter view interface 140. In some cases, the system 102 provides an option to the presenter to pause or resume the notes displayed in the teleprompter window 712, via the presenter device 104, for example, during the Q&A session.

Figure 11:
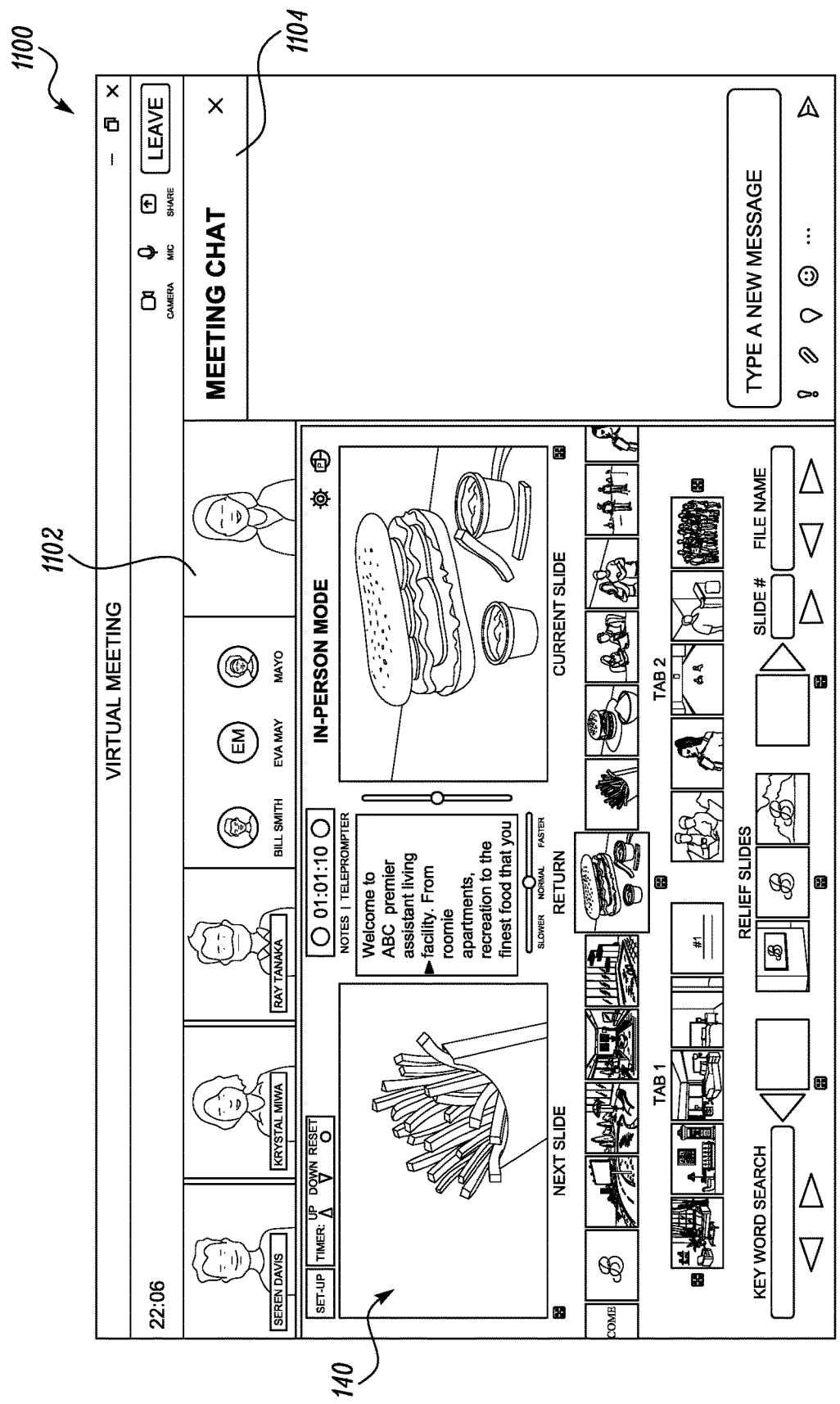
FIG. 11 illustrates an exemplary implementation of the presentation of the slides during a virtual live presentation, in accordance with some embodiments.

FIG. 11 illustrates an exemplary implementation of the presentation of the slides during a virtual live presentation within an online virtual meeting application 1100. As shown in FIG. 11, the presenter view interface 140 of the present disclosure can be integrated within an interface of the online virtual meeting application 1100. The presenter view interface 140 is displayed along with one or more portions, such as, the list of attendees 1102 and the chat window 1104, of the interface of the online virtual meeting application 1100. The integration of the presenter view interface 140 on the interface of the online virtual meeting application 1100 allows the presenter to seamlessly switch between multiple slides associated with one or more files, while performing other routine functioning associated with the online virtual meeting application 1100.

The system 102 and the method 300 of the present disclosure provide a simple and easy solution to enable the presenter to switch between multiple slides in a non-orderly manner without causing any interruption in the presentation or a loss of time. By displaying the plurality of thumbnails associated with one or more files on the presenter view interface 140, the selection of the desired slide becomes a simple and easy task for the presenter. Moreover, the recording of the sequence of production of the slides during the live presentation enables the presenter to maintain a copy of the as-shown live presentation without modifying the sequence of slides stored in the main file or the one or more auxiliary files. As an additional advantage, the system 102 of the present disclosure aids in quickly finding the desired slides to visually support a Question-and-Answer session, or a free-flowing virtual meeting discussion.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A system for presenting slides during a live presentation, the system comprising:
a transceiver;
a memory;
a primary display device; and
a processor communicatively coupled to the transceiver, the primary display device, and the memory, wherein the memory stores a set of instructions executable by the processor, and wherein upon execution of the stored instructions the processor is configured to:
display a series of first thumbnails corresponding to a plurality of first slides of a main file on a presenter view interface of the primary display device, the plurality of first slides being arranged in a first order, wherein
the plurality of first slides is sequentially producible on a viewing portion of the presenter view interface according to the first order to be sequentially presentable on one or more secondary display devices in response to corresponding requests, and
each first slide of the plurality of first slides disposed in succession to a slide produced on the viewing portion is configured to be indicated on an indicative portion of the presenter view interface prior to being produced on the viewing portion;
display a series of second thumbnails corresponding to a plurality of second slides of an auxiliary file on the presenter view interface of the primary display device, the plurality of second slides being arranged in a second order;
receive, via the transceiver, an input corresponding to a desired slide from one of the main file or of the auxiliary file to be presented on the viewing portion;
indicate the desired slide on the indicative portion in response to the input;
produce the desired slide on the viewing portion to present the desired slide on the one or more secondary display devices in response to an instruction, wherein
one or more slides disposed in succession to the desired slide according to one of the first order or the second order is sequentially producible on the viewing portion according to one of the first order or the second order to be sequentially presentable on the one or more secondary display devices in response to corresponding instructions, and
each slide of the one or more slides disposed in succession to a slide produced on the viewing portion is configured to be indicated on the indicative portion prior to being produced on the viewing portion.

2. The system according to claim 1, wherein the processor is configured to:
prior to receiving the input, sequentially produce one or more of the plurality of first slides on the viewing portion upon receiving corresponding requests via the transceiver; and
record and store a sequence of production of the one or more of the plurality of first slides, the desired slide, and the one or more slides presented in succession to the desired slide on the viewing portion into the memory.

3. The system according to claim 1, wherein the viewing portion of the presenter view interface is the only portion of the presenter view interface presentable on the one or more secondary display devices.

4. The system according to claim 1, wherein an area defined by the viewing portion on the presenter view interface is equal to an area defined by the indicative portion on the presenter view interface.

5. The system according to claim 1, wherein the processor is further configured to:
display notes associated with each slide produced on the viewing portion in a teleprompter window on the presenter view interface.

6. The system according to claim 1, wherein the processor is configured to receive the input corresponding to the desired slide by:
receiving, via the transceiver, a keyword-based query in a search window of the presenter view interface to identify the desired slide from the plurality of first slides or the plurality of second slides; and
detecting a selection of the desired slide.

7. The system according to claim 6, wherein the processor is configured to identify the desired slide based on notes, images, or text associated with one or more slides of the plurality of first slides or the plurality of second slides.

8. The system according to claim 1, wherein the processor is further configured to:
receive, via the transceiver, a request to customize the presenter view interface, wherein customization includes changing size or position of the series of first thumbnails, the series of second thumbnails, the viewing portion, and the indicative portion in the presenter view interface; and customize the presenter view interface based on the request.

9. A method for presenting slides during a live presentation, the method comprising:

displaying a series of first thumbnails corresponding to a plurality of first slides of a main file on a presenter view interface on a primary display device, the plurality of first slides being arranged in a first order, wherein
the plurality of first slides is sequentially producible on a viewing portion of the presenter view interface according to the first order to be sequentially presentable on one or more secondary display devices in response to corresponding requests, and
each first slide of the plurality of first slides disposed in succession to a slide produced on the viewing portion is configured to be indicated on an indicative portion of the presenter view interface prior to being produced on the viewing portion;

displaying a series of second thumbnails corresponding to a plurality of second slides of an auxiliary file on the presenter view interface of the primary display device, the plurality of second slides being arranged in a second order;

receiving an input corresponding to a desired slide from one of the main file or of the auxiliary file to be presented on the viewing portion;

indicating the desired slide on the indicative portion in response to the input;

producing the desired slide on the viewing portion to present the desired slide on the one or more secondary display devices in response to an instruction, wherein
one or more slides disposed in succession to the desired slide according to one of the first order or the second order is sequentially producible on the viewing portion according to one of the first order or the second order to be sequentially presentable on the one or more secondary display devices in response to corresponding instructions, and
each slide of the one or more slides disposed in succession to a slide produced on the viewing portion is configured to be indicated on the indicative portion prior to being produced on the viewing portion.

10. The method according to claim 9, further comprising:
prior to receiving the input, sequentially producing one or more of the plurality of first slides on the viewing portion upon receiving corresponding requests; and
recording and storing a sequence of production of the one or more of the plurality of first slides, the desired slide, and the one or more slides presented in succession to the desired slide on the viewing portion into a memory.

11. The method according to claim 9, wherein the viewing portion of the presenter view interface is the only portion of the presenter view interface presentable on the one or more secondary display devices.

12. The method according to claim 9, wherein an area defined by the viewing portion on the presenter view interface is equal to an area defined by the indicative portion on the presenter view interface.

13. The method according to claim 9, further comprising:
displaying notes associated with each slide produced on the viewing portion in a teleprompter window of the presenter view interface.

14. The method according to claim 9, wherein receiving the input corresponding to the desired slide includes:
receiving a keyword-based query in a search window of the presenter view interface to identify the desired slide from the plurality of first slides or the plurality of second slides; and
detecting a selection of the desired slide.

15. The method according to claim 14, wherein the desired slide is identified based on notes, images, or text associated with one or more slides of the plurality of first slides or the plurality of second slides.

16. The method according to claim 9, further comprising:
receiving a request to customize the presenter view interface, wherein customization includes changing size or position of the series of first thumbnails, the series of second thumbnails, the viewing portion, and the indicative portion in the presenter view interface; and
customizing the presenter view interface based on the request.

\* \* \* \* \*